United States Patent [19]

Maeda

[11] Patent Number: 5,692,217
[45] Date of Patent: Nov. 25, 1997

[54] SEMICONDUCTOR DISK UNIT WITH PROCESSOR FOR DIAGNOSIS AND COMMUNICATION WITH EXTERNAL DEVICE THROUGH A TWO LINES BUS

[75] Inventor: Takashi Maeda, Kanagawa-ken, Japan

[73] Assignee: Mitsubishi Denki Kabushiki Kaisha, Tokyo, Japan

[21] Appl. No.: 478,376

[22] Filed: Jun. 7, 1995

Related U.S. Application Data

[63] Continuation of Ser. No. 893,433, Jun. 4, 1992, abandoned.

[30] Foreign Application Priority Data

Jun. 5, 1991 [JP] Japan .................. 3-134164

[51] Int. Cl.$^6$ .................. G06F 13/12; G06F 13/00
[52] U.S. Cl. .................. 395/825; 395/183.03; 395/183.06; 395/839; 395/850
[58] Field of Search .................. 395/825, 826, 395/821, 183.06, 183.01, 183.2, 183.03, 183.07, 185.01, 185.1, 306, 309, 835, 839, 850; 360/77; 371/47.1

[56] References Cited

U.S. PATENT DOCUMENTS

| | | | |
|---|---|---|---|
| 4,651,278 | 3/1987 | Herzog et al. | 395/821 |
| 4,783,705 | 11/1988 | Moon et al. | 360/77 |
| 4,785,396 | 11/1988 | Murphy et al. | 395/821 |
| 4,942,552 | 7/1990 | Merrill et al. | 395/826 |
| 4,949,299 | 8/1990 | Pickett | 395/285 |
| 4,965,801 | 10/1990 | DuLac | 371/40.1 |
| 5,163,137 | 11/1992 | Yamamoto et al. | 395/286 |

FOREIGN PATENT DOCUMENTS

| | | |
|---|---|---|
| 1-148346 | 6/1990 | Japan . |
| 2-148346 | 6/1990 | Japan . |

*Primary Examiner*—Dinh G. Dung
*Attorney, Agent, or Firm*—Wolf, Greenfield & Sacks, P.C.

[57] ABSTRACT

A serial transmission control function for controlling serial transmission by means of only two transmission data and reception data signal lines is provided to the MPU 6 in the control section 4 of the semiconductor disk unit 1 so that the MPU 6 performs both general control and serial transmission control, whereby the size of the control substrate can be reduced and the control function can be improved.

6 Claims, 8 Drawing Sheets

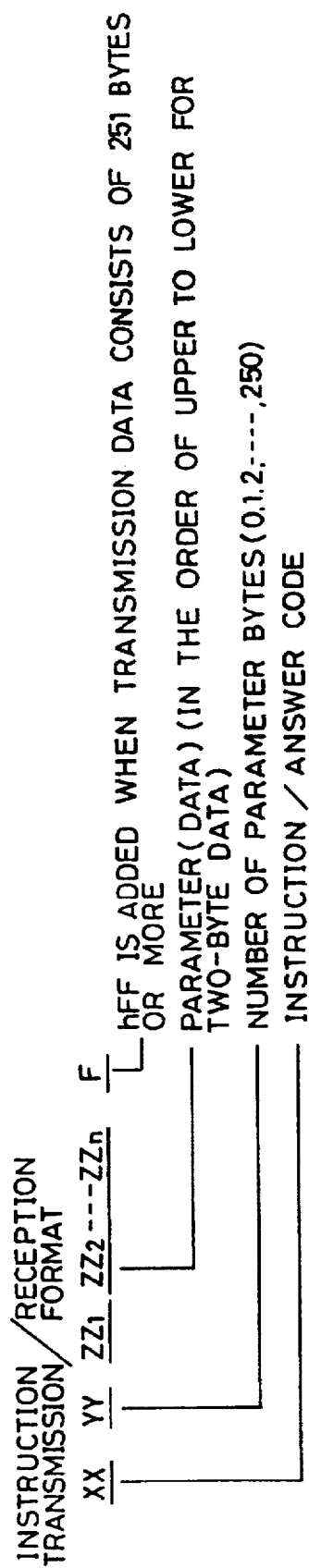

FIG. 4

| CODE | CONTROL INSTRUCTIONS | | REMARKS |
|---|---|---|---|
| | CONTENTS | | |
| 00 | SENSE | TO REQUEST UNIT STATUS | RESULTS OF EXECUTION CAN BE DUMPED BY Ax INSTRUCTION |
| 01 | STACK | TO CONTINUOUSLY EXECUTE UP TO 16 INSTRUCTIONS FROM THIS COMMAND | STACK INSTRUCTION/SPECIAL TEST |
| 02 | BREAK | TO SUSPEND RUNNING TEST | |
| 03 | CONT | TO START OPERATION SUSPENDED BY BREAK INSTRUCTION | STACK INSTRUCTION/SPECIAL TEST |
| 04 | STOP | TO STOP RUNNIG TEST | |
| 05 | WAIT | TO MAINTAIN IDLE STATE FOR THE LENGTH OF A PARAMETER | |
| 06 | RESET | TO RESET THE UNIT TO THE STATE WHEN IT IS TURNED ON | MPU'S PROGRAM RESET |
| 07 | HOME | TO RETURN ALL SETTINGS TO DEFAULT | EEPROM→ROM DEFAULT |
| 08 | PCA TEST1 | OUTPUT OF GA TWO-WAY HIGH IMPEDANCE | LED 07 |
| 09 | PCA TEST2 | SELF-DIAGNOSIS OF MAIN BOARD | LED DIAGNOSIS TEST NUMBER |
| 0A | | | |
| 0B | | | |
| 0C | TO FORCEDLY CLOSE CIRCUIT | | CANCELLATION OF INSTRUCTION |
| 0D | TO REQUEST DATA RETRANSMISSION | | |
| 0E | TO TRANSFER DATA, TO START TRANSFER OF DATA←THIS INSTRUCTION TO THE UNIT | | INSTRUCTION TO START TRANSFER TO DIAGNOSIS SYSTEM |
| 0F | TO REQUEST TRANSFER OF ERROR DATA/ PARAMETER | | |

FIG.5(A)

| CODE | No.OF BYTES | CODE 1 | CODE 2 | CONTENTS |
|---|---|---|---|---|
| 00 | 01 | | | TRANSFER OF ONE BYTE |
| | | 00 | | NOT READY |
| | | 01 | | IDLE |
| | | 80 | | RUNNING TEST (INSTRUCTION) |
| | | 81 | | RUNNING SPECIAL TEST (INSTRUCTION) |
| | | 10 | | NORMAL END OF TEST (INSTRUCTION) (WITHOUT TRANSFER DATA) |
| | | 11 | | NORMAL END OF TEST (INSTRUCTION) (WITH TRANSFER DATA) |
| | 02 | | | TRANSFER OF TWO BYTES |
| | | 20 | XX | ABNORMAL END OF TEST, ADDITION OF ERROR CODE (EACH INSTRUCTION CODE) (WITHOUT DATA) |
| | | 21 | XX | ABNORMAL END OF TEST, ADDITION OF ERROR CODE (EACH INSTRUCTION CODE) (WITH DATA) |
| | | | | "XX" IS AN ERROR CODE (EACH INSTRUCTION CODE) |

FIG.5(B)

| CODE | No.OF BYTE | CODE 1 | CODE 2 | CONTENTS |
|---|---|---|---|---|
| 01 | 01 | 10 | | TRANSFER OF ONE BYTE (NORMAL RECEPTION) |
| | | | | NORMAL RECEPTION |
| | 02 | 20 | | TRANSFER OF TWO BYTES (ABNORMAL RECEPTION) |
| | | | 00 | WRONG INSTRUCTION PARAMETER |
| | | | 01 | SPECIFIED NONEXISTENT TEST INSTRUCTION |
| | | | 02 | SPECIFIED PARAMETER NONEXISTENT IN THE TEST |
| | | | 03 | WRONG NUMBER OF TRANSFER PARAMETERS |
| | | | | RECEIVED IN-LINE NON-EXECUTABLE INSTRUCTION DURING IN-LINE ( ) |
| 02 | 01 | FF | | CIRCUIT FAILURE |
| | | | | TRANSFER OF ONE BYTE |
| | | F1 | | INCAPABLE OF READING INSTRUCTION CODE |
| | | F2 | | PARITY ERROR |
| | | F3 | | OVERRUN ERROR |
| | | | | FRAMING ERROR |

5,692,217

SEMICONDUCTOR DISK UNIT WITH PROCESSOR FOR DIAGNOSIS AND COMMUNICATION WITH EXTERNAL DEVICE THROUGH A TWO LINES BUS

This application is a continuation of application Ser. No. 07/893,433 filed Jun. 4, 1992 now abandoned.

BACKGROUND OF THE INVENTION

1. [Field of the Invention]

The present invention relates to a semiconductor disk unit which incorporats a control section for controlling an interface with a host device.

2. [Description of the Prior Art]

FIG. 7 is a block diagram of the internal configuration of a prior art magnetic disk unit comprising serial transmission means such as disclosed in Japanese Laid-Open Patent Publication No. 2-148346. In the FIG. 1a represents a magnetic disk unit, 2 a host device, 3 an external device, 4 and 5 a control section and a device section provided in the magnetic disk unit 1a, respectively, 6a an MPU (microprocessor) in the control section 4, 6b an MPU in the device section 5, 7 a serial transmission control section in the external device 3, 8 a small computer system interface (SCSI) control section in the control section 4, and 9 a device control section in the device section 5.

The operation of the conventional magnetic disk unit comprising serial transmission means will be described hereafter. Communication between the magnetic disk unit 1a and the serial transmission control section 7 of the external device 3 is performed via the MPU 6b provided independently in the device section 5 of the magnetic disk unit 1a over three signal lines: transmission data signal (TXD), reception data signal (RXD) and acknowledge signal (ACK) lines, all of which are connected to the MPU 6b. The MPU 6a for performing general control is provided in the control section 4 of the magnetic disk unit 1a separately from the MPU 6b for serial transmission.

The MPU 6b in the device section 5 of the magnetic disk unit 1a uses the three signal lines (the one-way TXD and RXD lines which are opposite to each other in transmission direction, and the two-way ACK line) to control serial transmission through the ON/OFF operation of the acknowledge signal. Such serial transmission means can operate a special command from the external device 3 through serial transmission by means of the MPU 6b provided in the device section 5 separately from the MPU 6a in the control section 4 near the host device 2, and can read data in the device section 5, thus making it possible to diagnose and test the device section 5 from the external device 3.

The conventional magnetic disk unit comprising serial transmission means is structured as described above. As shown in FIG. 7, the MPU 6b specifically used for serial transmission is provided in the device section 5 separately from the MPU 6a for performing general control disposed in the control section 4 of the magnetic disk unit 1a. Therefore, this limits the number of other devices to be mounted on the control substrate of the magnetic disk unit 1a. Furthermore, since communication between the MPU 6b in the device section 5 of the magnetic disk unit 1a and the serial transmission control section 7 in the external device 3 is performed over three signal lines (transmission data signal, reception data signal and acknowledge signal lines), connectors for each signal line also place a great limitation on the mounting of other devices on the control substrate of the magnetic disk unit 1a.

SUMMARY OF THE INVENTION

The present invention has been worked out to overcome the above problems, and it is an object of the present invention to achieve a semiconductor disk unit which can reduce the number of parts to be mounted on a control substrate in order to reduce the size of the control substrate, and can improve the control function thereof.

In a semiconductor disk unit according to the present invention, a serial transmission control function is provided to an MPU in the control section of the semiconductor disk unit so that serial transmission control in addition to general control can be performed by means of only two transmission data signal and reception data signal lines.

The MPU in the control section of this semiconductor disk unit of the present invention has a serial transmission control function, and uses only two signal lines (transmission data and reception data signal lines) to control serial transmission through interrupt control, thus making it possible to diagnose and test the device section of the semiconductor disk unit from the external device.

The above and other objects, features and advantages of the invention will become more apparent from the following description when taken in conjunction with the accompanying drawings.

BRIEF DESCRIPTION OF THE DRAWINGS

FIG. 3 illustrates the configuration of a command transmitted and received in the semiconductor disk unit of FIG. 1;

FIG. 4 illustrates an example of the command in the semiconductor disk unit of FIG. 1;

FIGS. 5(A) and 5(B) also illustrate another example of the command in the semiconductor disk unit of FIG. 1;

DESCRIPTION OF THE PREFERRED EMBODIMENT

Figure 1:
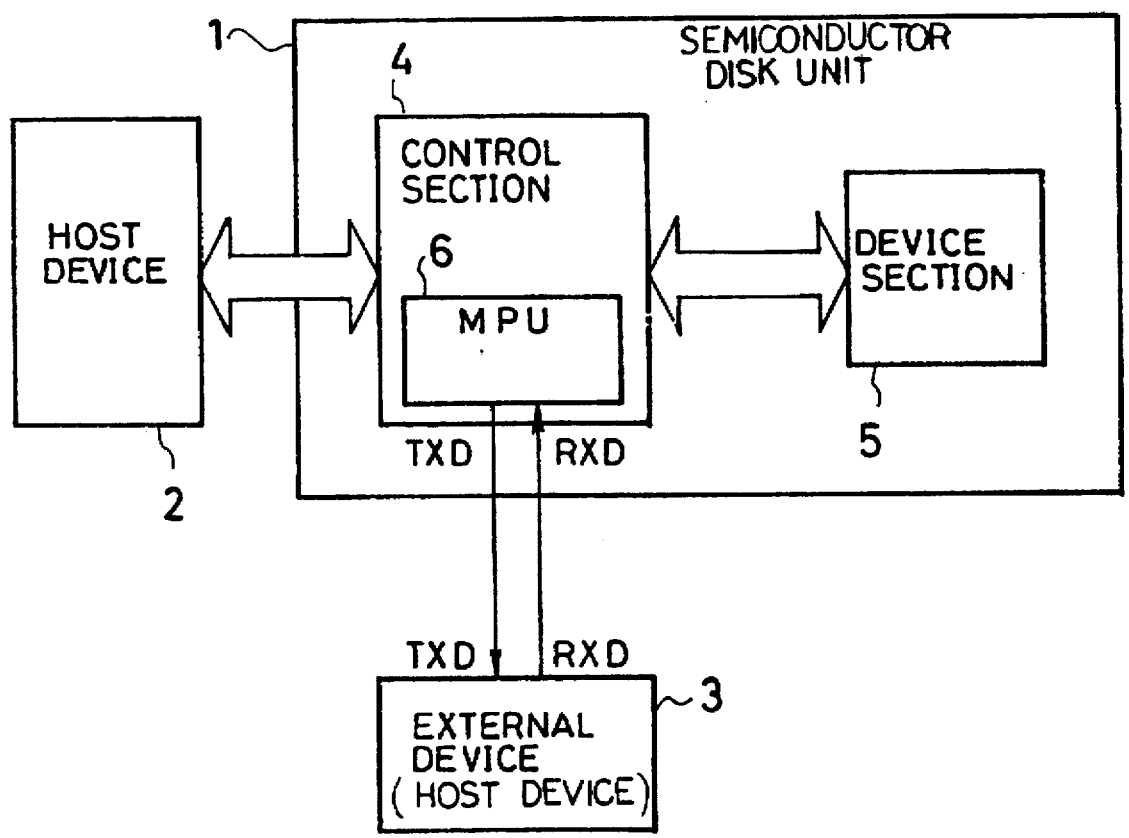
FIG. 1 is a schematic block diagram of the configuration of a semiconductor disk unit according to an embodiment of the present invention.
Figure 2:
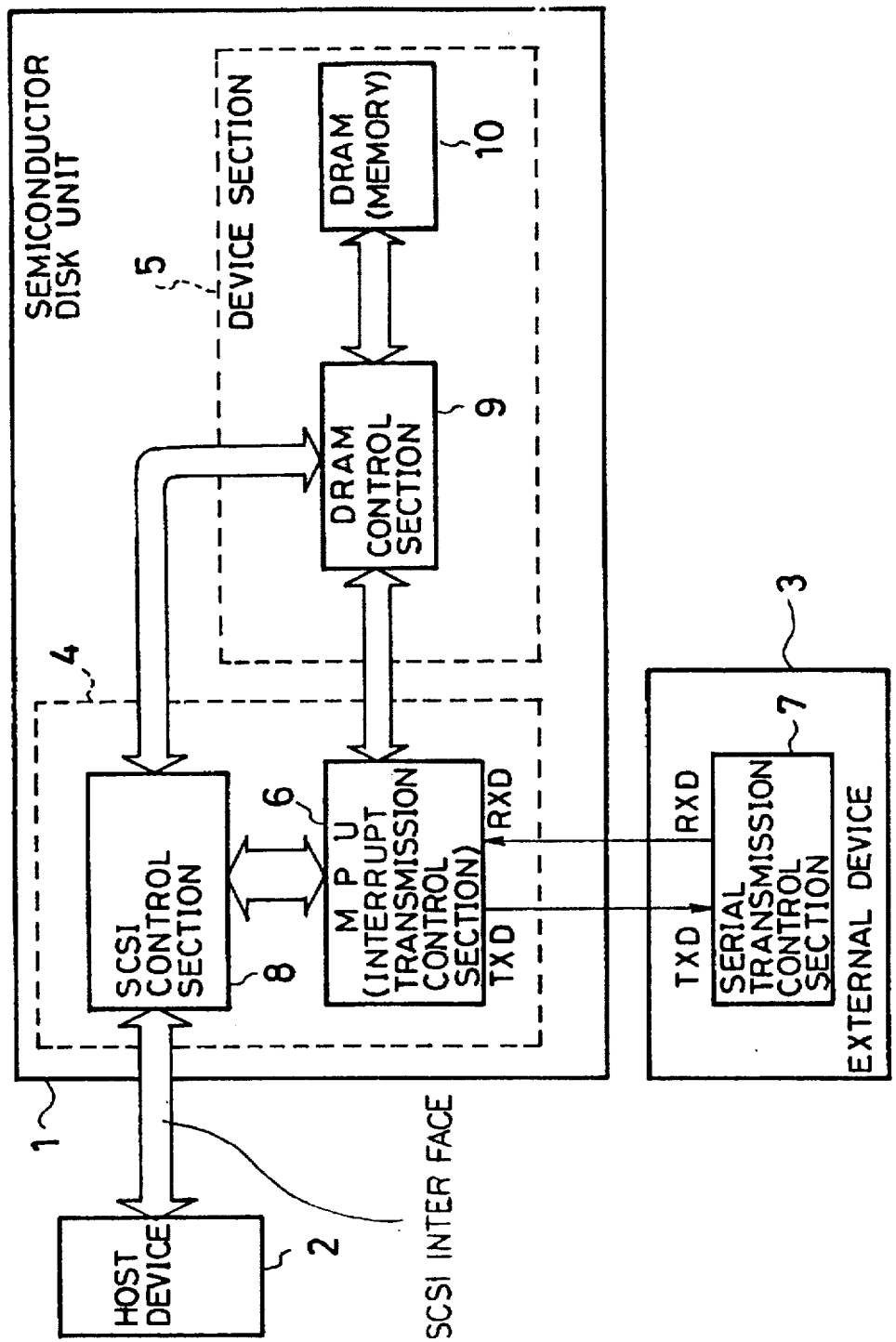
FIG. 2 is a block diagram of the internal configuration of the semiconductor disk unit of FIG. 1.

A preferred embodiment of the present invention will be described hereafter with reference to the accompanying drawings. FIG. 1 is a schematic block diagram of the configuration of a semiconductor disk unit according to the embodiment of the present invention. FIG. 2 is a block diagram of the internal configuration of the semiconductor disk unit of FIG. 1 . In the figures, numeral 1 represents a semiconductor disk unit having a built-in control section which consists of a control section 4 and a device section 5. The control section 4 consists of an MPU 6 which is an interrupt transmission control section, and a small computer system interface control section 8 for controlling an interface under the control of the MPU 6. The control section 4 and a host device 2 are connected to each other by a small computer system interface. The device section 5 consists of a DRAM control section 9 for controlling a DRAM (memory) 10 under the control of the MPU 6 of the control section 4 and the DRAM 10. The MPU 6 constitutes serial transmission control means.

The MPU 6 in the control section 4 of the semiconductor disk unit and the serial transmission control section 7 of the external device 3 are connected to each other by two serial transmission control lines: transmission data signal (TXD) and reception data signal (RXD) lines which are opposite to each other in transmission direction. Therefore, serial transmission control is performed by the MPU 6 in the control section 4 in this embodiment. Moreover, in the embodiment, serial transmission is performed between the external device 3 and the MPU 6, and reading and writing data in the device section 5 of the semiconductor disk unit 1, internal control, and diagnosis and tests on the device section 5 and the SCSI control section 8 are possible from this external device 3.

FIG. 3 illustrates the configuration of a command transmitted and received in the semiconductor disk unit of FIG. 1. The command shown in FIG.3 consists of n-bytes in total. The first byte indicates an instruction cede, the second byte indicates the number of parameter bytes after the second byte, the third to n−1-th bytes indicate parameters. When transmission data is divided and transmitted in two or more transmissions, "hFF" is added after the last parameter (data) to be transmitted, except for the last transmission. This may occur when the number of parameters to be sent is greater than 250 bytes, or when the number of parameters is lessened to 50 bytes and the message is nonetheless split for transmitting separate data.

FIGS. 4 and 5 illustrate examples of the command in the semiconductor disk unit of FIG. 1. FIG. 4 shows part of the control instructions from the external device 3, and FIG. 5 illustrates part of the answer commands supplied to the external device 3 through the serial transmission control of the MPU 6 of the control section 4.

Figure 6:
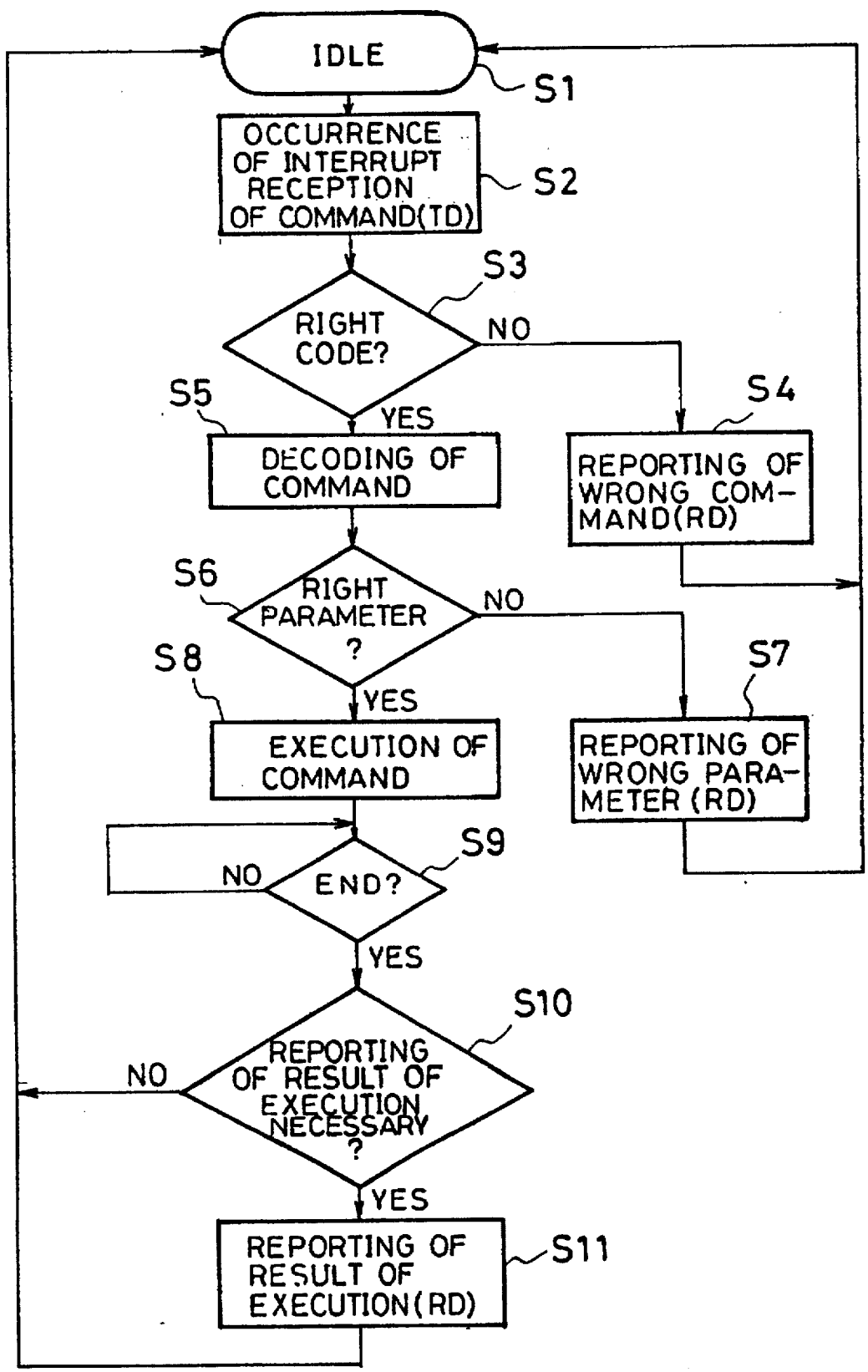
FIG. 6 is a flowchart for explaining the control operation of the MPU in the control section of the semiconductor disk unit of FIG. 1 upon reception of the command.
Figure 7:
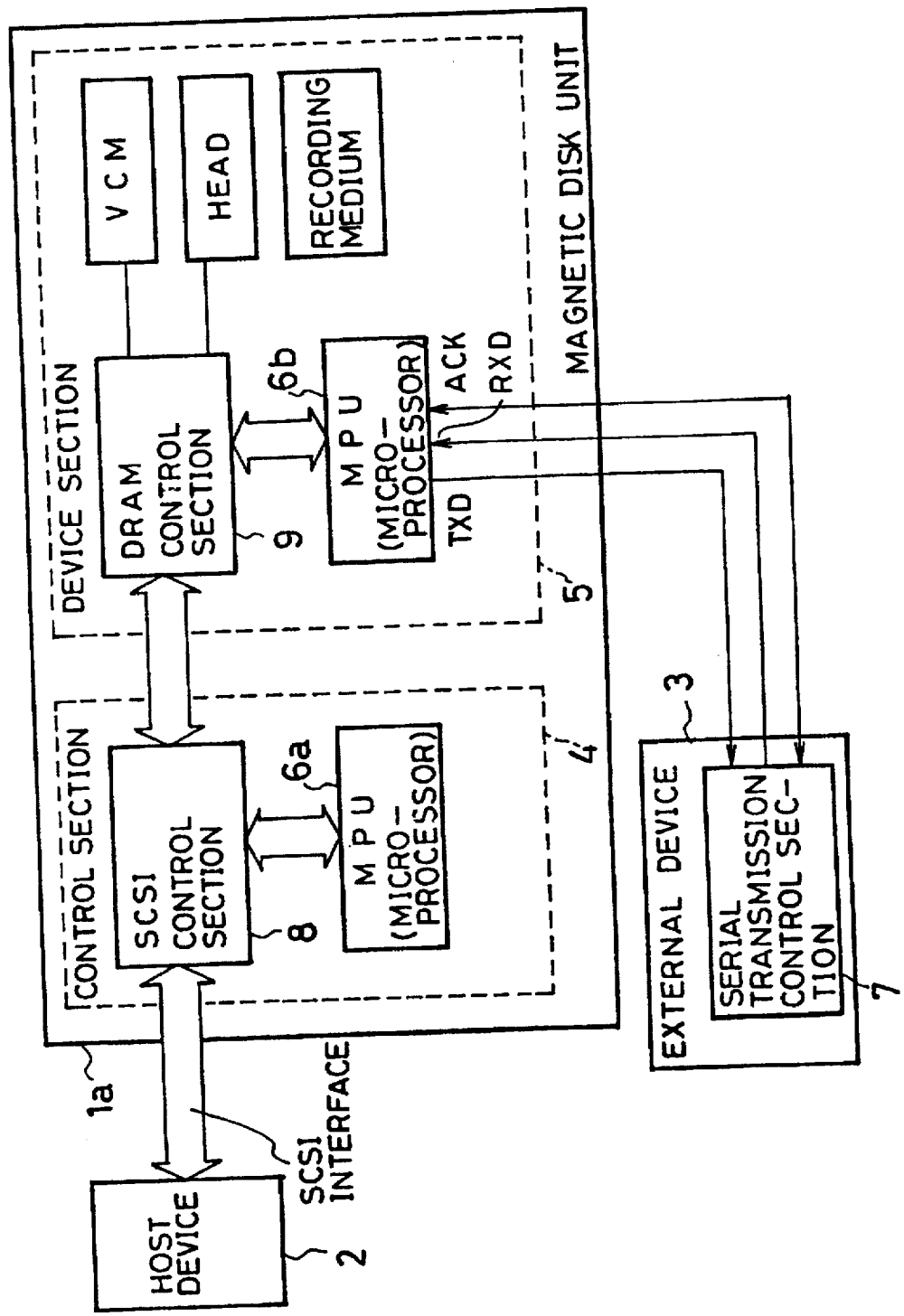
FIG. 7 is a block diagram of the internal configuration of a conventional magnetic disk unit comprising serial transmission means.

FIG. 6 is a flow chart for explaining the control operation of the MPU in the control section of the semiconductor disk unit of FIG. 1 upon reception of a command. In the figure, S1 to S11 are processing steps indicative of each operation process.

Next, in the semiconductor disk unit according to the embodiment of the present invention, the operation flow of the MPU 6 of the control section 4 when a command is transmitted from the external device 3 will be explained with reference to the flow chart of FIG. 6.

In processing step S1, the MPU 6 of the control section 4 does not perform serial transmission control. However, at this time, the MPU 6 performs other controls such as SCSI control and device control.

In processing step S2, data is transmitted from the external device 3, whereby an interrupt occurs, and the MPU 6 switches to serial transmission control.

In processing step S3, data (a command) from the external device 3 is checked. At this time, when the command is wrong, the process goes to S4.

In processing step S4, the fact that the command is wrong is reported to the external device 3 to terminate serial transmission control (interrupt). Thereafter, the progress returns to S1.

In processing step S5, the command is decoded, and the process jumps to each command execution routine.

In processing step S6, a parameter added to the command is checked. At this time, when the parameter is wrong, the process goes to S7.

In processing step S7, the fact that the parameter is wrong is reported to the external device 3 to terminate serial transmission control (interrupt). Thereafter, the process returns to S1.

In processing step S8, the command is executed.

In processing step S9, the completion of the execution of the command is awaited.

In processing step S10, whether the result of the execution of the command needs to be reported to the external device 3 or not is checked. At this time, if it does not, serial transmission control (interrupt) is terminated. Thereafter, the process returns to S1.

In processing step S11, the result of the execution of the command is reported to the external device 3 to terminate serial transmission control (interrupt). Thereafter, the process returns to S1.

Based on such interrupt control, reading and writing data in the device section and internal control can be performed directly by the external device or other host device.

A semiconductor disk unit has been explained as an example in the above embodiment, but the present invention wherein each command is executed independently using interrupt transmission control as in this embodiment based on the serial transmission procedure of only two transmission data and reception data can be applied to magnetic disk units as well.

As described in the foregoing, according to the semiconductor disk unit of the present invention, a serial transmission control function is provided to the MPU in the control section of the semiconductor disk unit so that serial transmission control in addition to general control is performed by only two transmission data and reception data signal lines, whereby the size of a control substrate for mounting parts on the semiconductor disk unit can be reduced as compared with a conventional disk unit of this kind, and the control function can be improved.

What is claimed is:

1. A data storage device comprising:
    an interface control means coupled to a host device through an interface;
    a device section comprising a memory means and a memory control means coupled to said interface control means and to said memory means;
    a control means, coupled to said interface control means and to said memory control means and also coupled to an external device or to a second host device through a pair of data transmission and reception lines, for controlling said interface control means and said memory control means, and for executing diagnosis and test of said device section by interruption processing upon reception of a control command from said external device, said control means including:
        means for determining whether said received command is correct;
        means, responsive to the received command not being correct, for reporting that the received command is not correct to said external device; and
        means, responsive to the received command being correct, for executing the received command by means of said interruption processing and for reporting the result of such execution to said external device through said transmission data signal line.

2. The semiconductor disk unit according to claim 1, wherein said control means comprises a microprocessor.

3. The semiconductor disk unit according to claim 1, wherein said control means includes means for responding to an interrupt by said received command during execution of a control program and for processing said received command.

4. The semiconductor disk unit of claim 1, wherein said received command includes an instruction code, a code indicative of a number of parameters to be transmitted, and a plurality of command parameters.

5. The semiconductor disk unit of claim 4, wherein said received command further includes at least one byte indicating an existence of continuous data.

6. The semiconductor disk unit of claim 5, wherein the received command comprises a number, greater than three, of bytes, and wherein:

the instruction code includes a single byte;

the code indicative of the number of parameters includes a single byte;

the plurality of parameters includes the number, less three, of bytes, and the data indicative of the existence of continuous data includes a single byte.

* * * * *